United States Patent [19]
Koch

[11] Patent Number: 5,526,717
[45] Date of Patent: Jun. 18, 1996

[54] SEVERING AND STRIPPING MECHANISM FOR A CABLE-PROCESSING MACHINE

[75] Inventor: Max Koch, Meggen, Switzerland

[73] Assignee: Komax Holding AG, Meggen, Switzerland

[21] Appl. No.: 237,998

[22] Filed: May 4, 1994

[30] Foreign Application Priority Data

May 6, 1993 [CH] Switzerland ............ 01 399/93-2

[51] Int. Cl.⁶ .................................................. H02G 1/12
[52] U.S. Cl. ................................................. 81/9.51; 83/947
[58] Field of Search .............................. 81/9.51; 83/947

[56] References Cited

U.S. PATENT DOCUMENTS

| | | |
|---|---|---|
| 3,909,900 | 10/1975 | Gudmestad. |
| 4,275,619 | 6/1981 | Shimizu. |
| 4,612,696 | 9/1986 | Talley .............................. 81/9.51 |
| 4,802,512 | 2/1989 | Kodera ............................. 81/9.51 |

FOREIGN PATENT DOCUMENTS

| | | |
|---|---|---|
| 0127330 | 12/1984 | European Pat. Off.. |
| 0136852 | 4/1985 | European Pat. Off.. |
| 0234929 | 9/1987 | European Pat. Off.. |
| 0499753 | 8/1992 | European Pat. Off.. |
| 0509192 | 10/1992 | European Pat. Off.. |

OTHER PUBLICATIONS

European Search Report and Annex.
Printed Product Sheet of Japanese Company, Shin Meiwa Industry Co. Ltd., of Yokohama, Japan.

Primary Examiner—Bruce M. Kisliuk
Assistant Examiner—Joni B. Danganan
Attorney, Agent, or Firm—Greenblum & Bernstein

[57] ABSTRACT

A severing and stripping mechanism for a cable-processing machine which largely obviates the displacement of heavy cable-handling components and the fouling of the knife drive, particularly via insulation particles via the use of a knife drive that is arranged above a plane determined by the cable being processed, wherein two knife pairs are attached side-by-side at the actuation members of the knife drive, with a fixed pivot mechanism being attached on a machine frame via which, after the severing of the cable with the first knife pair, the one cable end is pivoted to the second knife pair, whereafter the one cable end is stripped with the second knife pair and that the other cable end is stripped with the first knife pair.

10 Claims, 6 Drawing Sheets

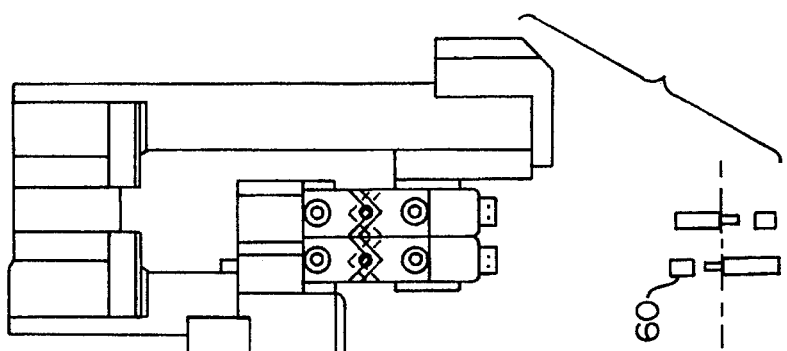
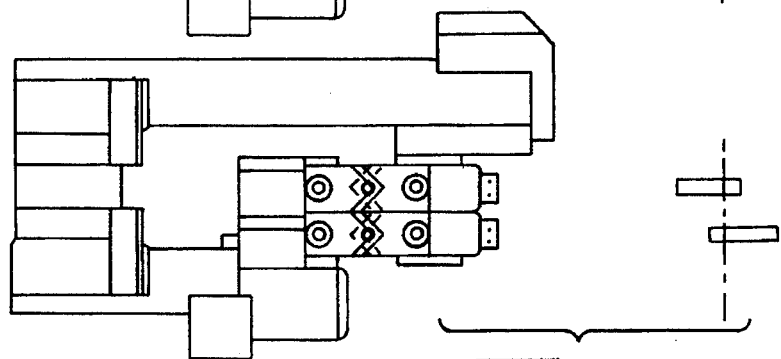
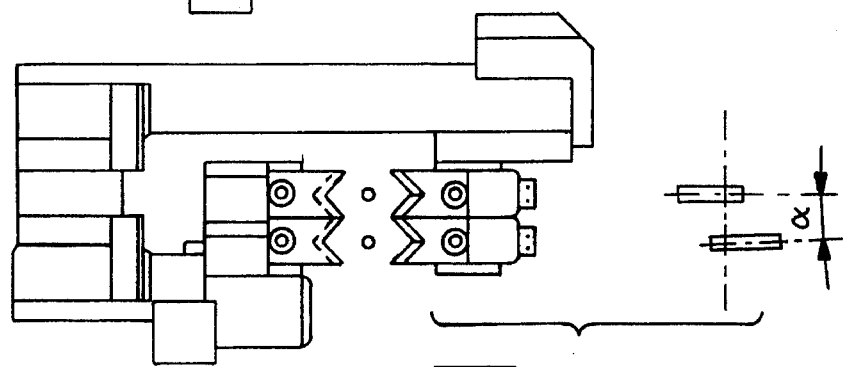
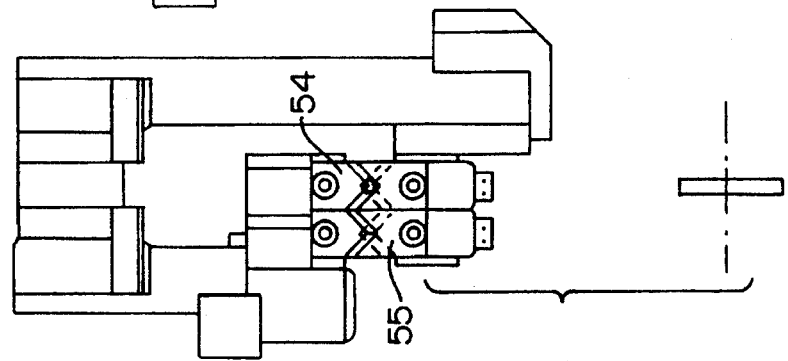
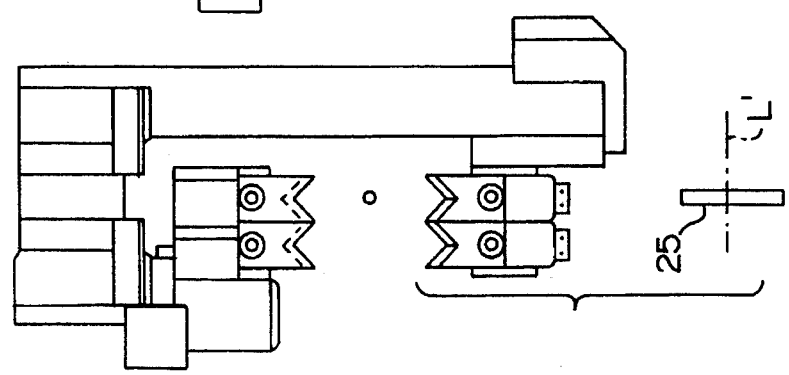

SEVERING AND STRIPPING MECHANISM FOR A CABLE-PROCESSING MACHINE

CROSS REFERENCE TO RELATED APPLICATIONS

This application claims the priority of Swiss Application No. 01 399/93-2, filed May 6, 1993, the disclosure of which is incorporated herein by reference in its entirety.

BACKGROUND OF THE INVENTION

1. Field of the Invention

This invention pertains to a severing and stripping mechanism for a cable-processing machine, wherein the mechanism includes at least one knife pair whose knives are secured, via knife retainers, on the actuation members of a knife drive and provided with offtake drives, via which the cable ends, after the severing of the cable, are displaced for stripping purposes.

2. Discussion of the Background of the Invention and Material Information

European patent application EP-A 0,509,192, discloses a mechanism with which an electrical cable can be severed with a minimal expenditure of time and stripped to different lengths, without requiring a change of the severing and stripping tools during changes of the stripping length and/or the cross section of the cable. For this purpose, two stripping knives are arranged in each of two knife retainers in a predetermined, fixed distance from a severing knife. The stripping knives, relative to the severing knives, are reduced in length for a such predetermined amount that, during a first part of the working stroke of a knife drive, only the cable is severed. Thereafter, an offtake drive pulls the cable ends back from the place of severing for the desired stripping length, whereupon, during a second part of the working stroke of the knife drive, the insulation is cut. During a further return movement of the cable ends, caused by the offtake drive, the insulation scrap is pulled off while the stripping knives are closed. This mechanism utilizes a relatively complicated knife drive that is arranged underneath the working area so that, in spite of seals, dirt and insulation particles advance up to the gear wheels of the knife drive and cause problems during extended operation thereof. In addition, with this mechanism only those stripping lengths can be achieved that lie within the predetermined, fixed distance of the previously-described knife arrangement.

A printed product sheet of the Japanese company, Shin Meiwa Industry Co. Ltd., located at 2-43, Shitte 3-chome, Tsurumi-ku, Yokohama 230, Japan, describes a severing and stripping mechanism which includes a knife pair that includes several cutting edges on each knife. During operation, there occurs, as usual, the severing of the cable with the multi-cutting edge knife after the length-wise transport of the cable. After the knife opening, the cable handling components move linearly and parallel to the knife, via controlled spindles, to the left and to the right to a stripping place. Thereafter, the handling components, on each side of the knife, with the cut cables, are displaced in the direction of the knife for the required stripping length. This is followed by a knife stroke to the required stripping diameter and the pullback of the insulation remnants or scrap as well as the linear further movement or return movement of the cable depending on the next working step. A disadvantage of this mechanism resides therein that the relatively heavy cable handling component must constantly be displaced in the axial and lateral directions which can lead to greater clock cycles or greater energy usage and wear. In addition, the utilization of multiple edge knives can be economically disadvantageous since it can lead to unequal wear thus requiring the changing thereof even though useable cutting edges remain.

In a similar mechanism, disclosed in European patent publication EP-A-0,499,753, difficulties can occur during the processing of very flexible conductors. Since such conductors, particularly when connecting elements have already been clamped thereto, can droop considerably, they can bump into the knives during the further transporting thereof. In order to prohibit same, cable guides are provided between the knives, thus causing the mechanism to become more complicated and correspondingly more expensive.

SUMMARY OF THE INVENTION

A primary purpose or object of the present invention is to provide a mechanism of the previously-described type, which is free of the noted disadvantages, whereby particularly the fouling of the knife drive and the displacement of heavy cable handling components are avoided.

The object or purpose of this invention is achieved via a knife drive that is arranged above the plane of that of the cable to be processed, wherein two knife pairs are attached next to each other on the actuation members of the knife drive. A pivot mechanism is fixedly arranged on a machine frame, via which after the severing of the cable with the first knife pair, one cable end is pivoted to the second knife pair, whereafter the one cable end is stripped with the second knife pair and the other cable end is stripped with the first knife pair.

Specifically, a severing and stripping mechanism for an automatic cable-processing machine, for cutting and then stripping the insulation from the cut ends of a moving electrical cable, includes multiple knife pairs having knives; the knives being attached, via knife retainers on the actuating members of a knife drive; multiple offtake drives for displacing the cable ends, after severing of the cable for the purpose of stripping the insulation from said cut ends; the knife drive being arranged above a plane determined by the cable being processed; first and second knife pairs, with the knives of the knife pairs being attached on the knife retainers transversely to the longitudinal moving direction of the cable and laterally offset from each other; a fixed pivot mechanism provided on a machine frame, the pivot mechanism, after the severing of said cable with the first knife pair, pivoting one of the cable ends to the second knife pair; the second knife pair being utilized for stripping the one of the cable ends; and the first knife pair being utilized for stripping another one of the cable ends. Preferably, the knives are directly attached side-by-side, at the knife retainers.

In another embodiment of this invention, the knives are attached at the knife retainers, in the longitudinal moving direction of the cable, offset at a spacing (a) from each other. Preferably, a first offtake drive is attached at the pivot mechanism and a second offtake drive is attached at the machine frame.

In a further embodiment of this invention, the pivot mechanism includes a cogged belt wheel, the cogged belt wheel being attached on a hollow shaft, with the hollow shaft being journalled in a bearing portion connected with the machine frame; the first offtake drive is attached, on the cogged belt wheel, with a base plate; the mechanism further including the first offtake drive, having a drive shaft, with the drive shaft extending through a hollow shaft, and being journalled at an upper end thereof in the base plate; a cogged belt wheel being provided at the upper end of the drive shaft, the cogged belt wheel being connected, via a cogged belt, with a further cogged belt wheel, the further cogged belt wheel being journalled at the base plate; guide rods being attached to side plates, with the side plates being connected with the base plate; a slide rest being carried by the guide rods, the slide rest being connected with the cogged belt via a coupling part; and a first clamping device, for the clamping of the cable, being attached on the slide rest.

In yet another embodiment of this invention, the second offtake device includes a base plate and a cover plate, the base and cover plates being connected with each other via bearing brackets; a drive shaft, the drive shaft having a lower end thereof journalled in the cover plate and carrying another cogged belt wheel, the another cogged belt wheel being connected, via a further cogged belt, with a further cogged belt wheel, the further cogged belt wheel being journalled on the cover plate: further guide rods are displacably journalled in bearing brackets, the bearing brackets being connected with a coupling part attached at the further cogged belt, wherein at one of the ends of the further guide rods a connecting plate is attached and at another of the ends of the further guide rods a mounting plate is attached; and a second clamping device, is arranged on the mounting plate for the clamping of a severed cable end.

In yet a further embodiment of this invention, the actuation members are prismatic guide rods, that extend, in a guide housing, in the vertical direction; the guide rods being formed as gear racks at the upper ends thereof and being in mesh with a pinion of a motor; the knife pairs including lower knives, with the lower knives, via a first knife retainer, being attached at a lower end of the first guide rod; and the knife pairs including upper knives, with the upper knives, via a second knife retainer, being attached at a lower end of the second guide rod.

In still a further embodiment of this invention, the knives are attached at the knife retainers, in the longitudinal moving direction of the cable, offset at a spacing (a) from each other; and the first knife retainer having a short leg and a long leg, the legs extending parallel, at a distance (a) to one another; the lower knife of the first knife fair being attached to the short leg and the lower knife of the second knife pair being attached to the long leg; and an angularly formed cover is attached to the short and long legs, thereby forming an enclosure with a substantially prismatic cross section.

In a final embodiment of this invention, both of the knife pairs are comprised of one of single edged V-knives and V-formed knives, or the first knife pair is comprised of single-edged knives and the second knife pair is comprised of single-edged stripping-form knives.

The advantages achieved by means of this invention reside therein that, via the proposed arrangement of the knife drive, fouling and thus operating interruption can be avoided. The knife drive is constructed more simply and sturdily and thus less susceptible to malfunctions. Via the adjacent knife pairs it becomes possible to vary the stripping length in a greater range. Since each knife has but one cutting edge, during uneven wear, only the applicable knife needs to be changed, whereby, relative to multiple-edged knives, cost can be reduced. An additional advantage is achieved in that, via the pivot mechanism, the displacement of relatively heavy cable handling components, during the changing from the severing to the stripping operation, can be avoided. With the additionally suggested combination of V-knives and form-stripping knives, better stripping quality is achieved. In accordance with an advantageous further embodiment of this mechanism, the insulation remnants that accumulate during stripping are concentrated in a relatively small space so that they can be removed without any problems.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have generally been used the same reference characters to denote the same or analogous components and wherein:

FIGS. 6a to 6e show the knife drive in different working positions, and the corresponding fabrication conditions of the cable or rather the cable ends;

DETAILED DESCRIPTION OF THE PREFERRED EMBODIMENTS

With respect to the drawings it is to be understood that only enough of the construction of the invention and the surrounding environment in which the invention is employed have been depicted therein, in order to simplify the illustrations, as needed for those skilled in the art to readily understand the underlying principles and concepts of the invention.

Figure 1:
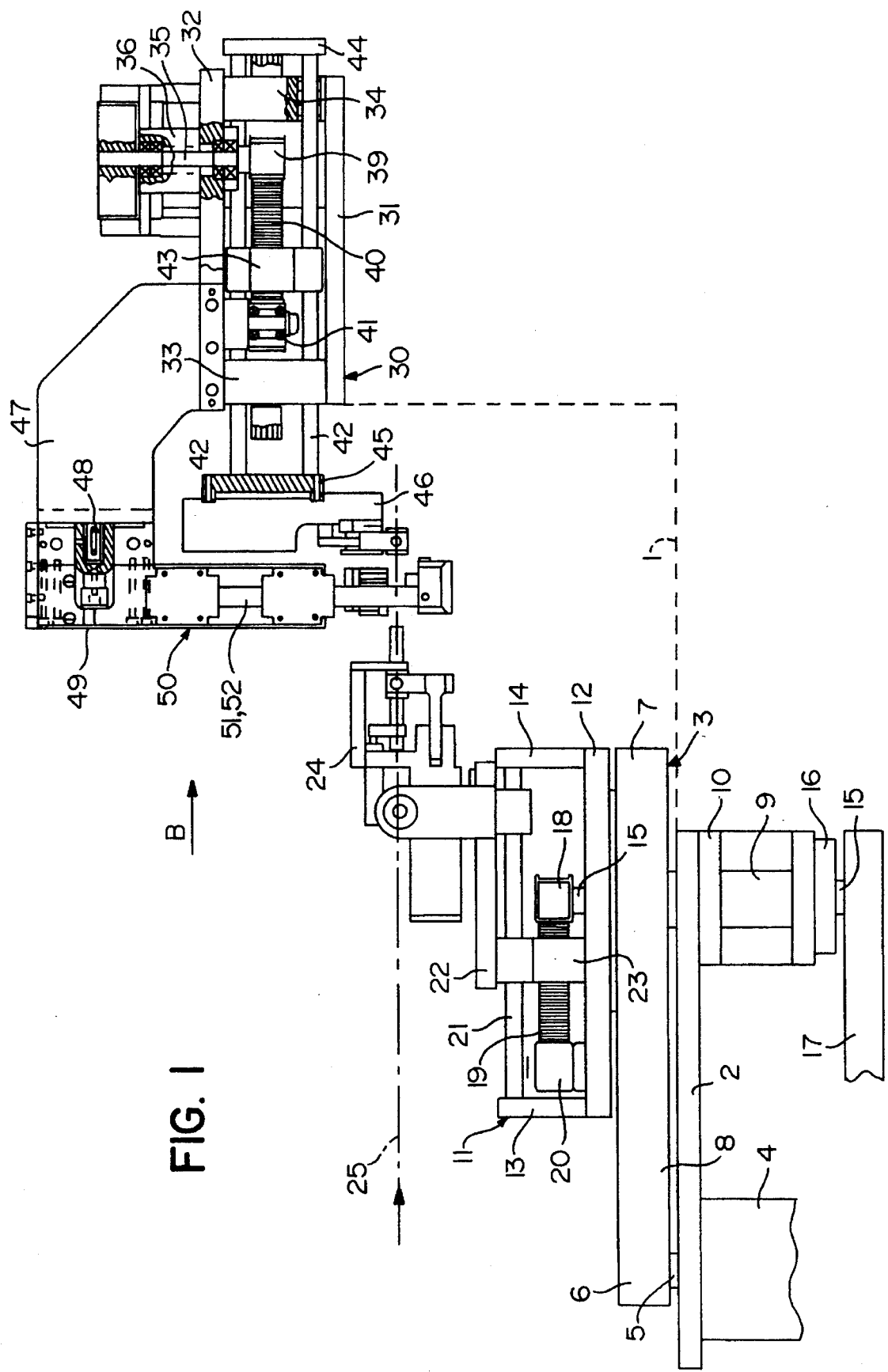
FIG. 1 is a partially sectioned view of a part of a cable-processing machine according to the mechanism of the invention, seen in the direction of arrow A (FIG. 2)
Figure 2:
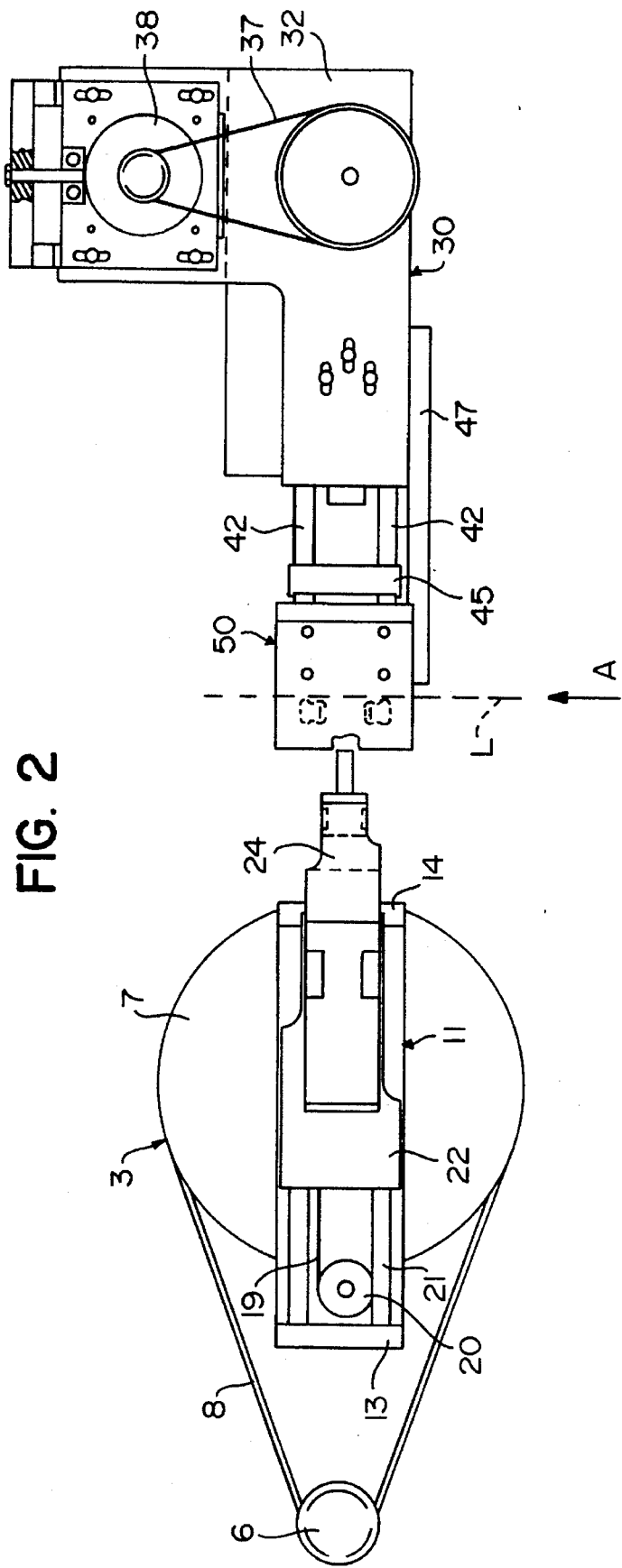
FIG. 2 is a plan view of a part of the cable-processing machine of FIG. 1.

In FIG. 1 and 2, a machine frame of an automatic cable-processing machine is denoted by numeral 1, with the machine frame being solely indicated by broken lines. On a beam 2, connected with machine frame 1, a pivot mechanism 3 is arranged which consists of a motor 4, a first cogged belt drive 6 placed on motor shaft 5, a second larger cogged belt wheel 7, and a further cogged belt wheel 8 that connects both cogged belt wheels 6 and 7. Second cogged belt wheel 7 is attached on a hollow shaft 9 which is journalled on a bearing portion 10 connected with beam 2. A first offtake drive is denoted by numeral 11, with offtake drive 11, having a base plate 12 and first and second side plates 13, 14 wherein the base plate is attached on second cogged belt wheel 7. A drive shaft 15, extending through the hollow shaft 9, is journalled, at its upper end, in base plate 12 and at its lower end in a bearing bracket 16 attached to bearing portion 10. Drive shaft 15 is driven, at its lower end by a cogged belt drive 17 via a non-illustrated motor. A cogged belt wheel 18 is placed at the upper end of drive shaft 15, with cogged belt wheel 18 being connected, via a cogged belt 19, with an additional cogged belt wheel 20 which is journalled at base plate 12. Secured to side plates 13, 14 are guide rods 21, which guide a slide rest 22 which is connected, via a coupling part 23, with cogged belt 19. A first clamping device 24, attached on slide rest 22, serves for the retention of a cable 25 to be processed and which, for example, can be pneumatically actuated. First offtake drive 11 can be controlled via a computer, wherein the swing angle of cogged belt wheel 18 and therewith the displacement of slide rest 22 with first clamping device 24 and cable 25, can be preselected via programming.

A second offtake drive 30, attached to machine frame 1, includes a base plate 31 and a cover plate 32, with these plates being connected with each other via bearing brackets 33, 34. A drive shaft 35 has its lower end journalled in cover plate 32 and has its upper end journalled in a bearing box 36 attached on cover plate 32. Drive shaft 35 is driven at its upper end by a motor 38 via a cogged belt drive 37 (FIG., 2). The lower end of drive shaft 35 carries a cogged belt wheel 39 which is connected, via a cogged belt 40, with an additional cogged belt wheel 41 that is journalled in cover plate 32. Guide rods 42 are displaceably journalled in bearing brackets 33, 34 which are connected with a coupling part 43 attached at a cogged belt 40. At one of the ends of guide rods 42 a connecting plate 44, and at the other ends, a mounting plate 45 is attached. A second clamping device 46, serving for the clamping of the severed cable ends, is arranged on mounting plate 45, which, for example, can also be pneumatically actuated. The second offtake drive 30 can be controlled in the same manner as first offtake drive 11. A transom 47, attached on cover plate 32, has a knife drive 50, which will be described in more detail hereinafter with reference to FIGS. 3 and 5, with knife drive 50 being attached thereto in such a manner that it is arranged above a plane determined by the cable 25 that is to be processed. Knife drive 50 is driven via a non-illustrated motor upon whose drive shaft 48 a pinion 49 is affixed.

Figure 3:
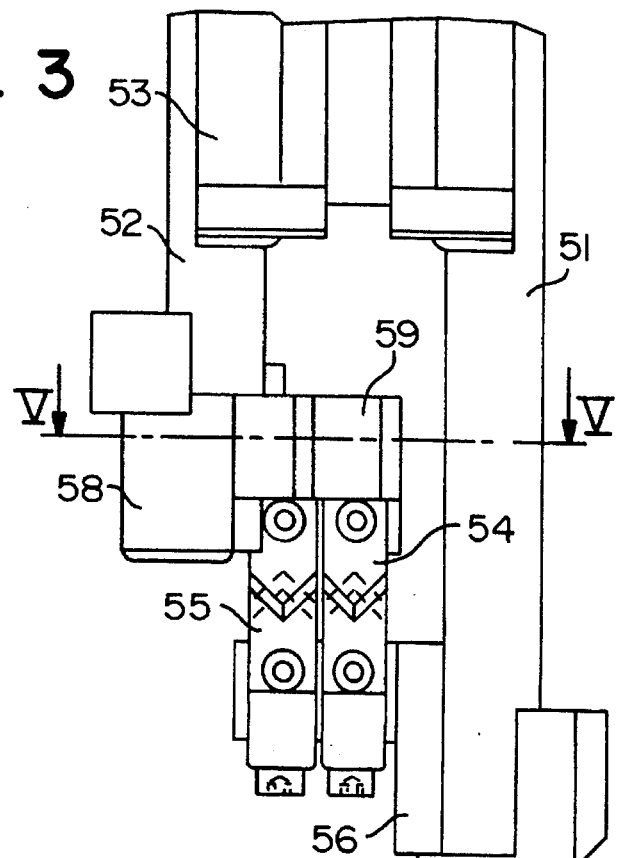
FIG. 3 is a partial view of a knife drive of the mechanism of the invention, seen in the direction of arrow B (FIG. 1)
Figure 4:
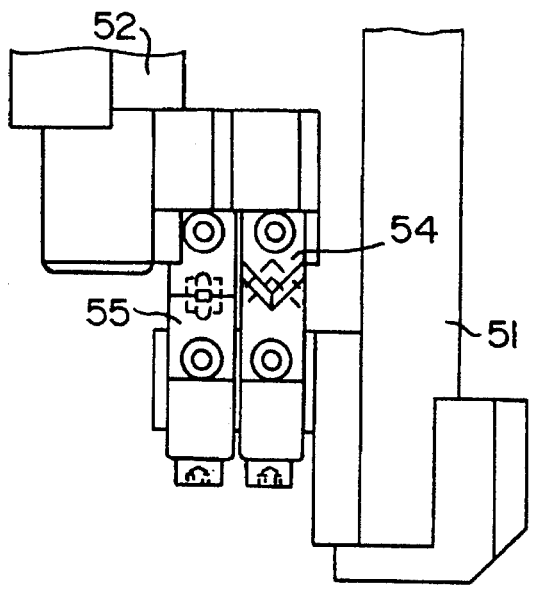
FIG. 4 is a partial view of a variation of the knife drive of FIG. 3.
Figure 5:
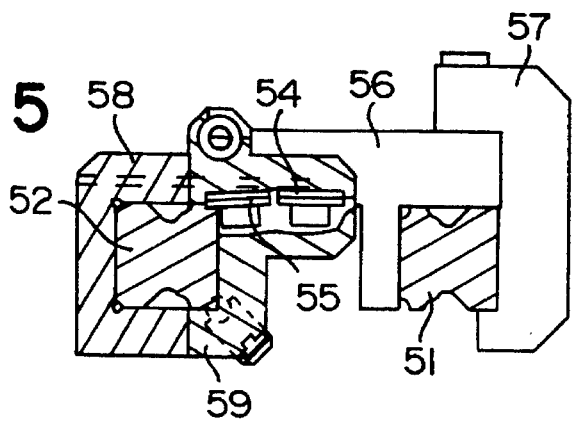
FIG. 5 is a section of the knife drive according to Line V—V of FIG. 3.

According to FIG. 3 and 5, knife drive 50 includes two actuation members 51, 52 in the form of prismatic guide rods that extend in the vertical direction within a guide housing 53. The upper ends of guide rods 51, 52 are formed as gear racks and are in mesh with pinion 49 (FIG. 1). At the lower ends of each of guide rods 51, 52, two knives of two knife pairs 54, 55 are attached in such a manner that they are transverse to the longitudinal direction of the cable, laterally offset from each other, for at least a knife width and rest side-by-side. The lower knives of knife pairs 54, 55 are screwed onto a first knife retainer 56 which is attached to first guide rod 51 via a first clamping piece 57. The upper knives of knife pairs 54, 55 are screwed onto a second knife retainer 58 which is attached to second guide rod 52 via a second clamping piece 59. The bearing surfaces of the knives of the second knife pair 55, at knife retainers 56, 58, are inclined with reference to the bearing surfaces of the knives of first knife pair 54 in such a manner that, during the pivoting of pivot mechanism 3, from the first to the second pair of knives, the cable can be gradually furnished vertically to the knife edges. Pinion 49 is arranged between guide rods 51, 52 so that during its motion of rotation, guide rods 51, 52, and therewith the knives, are moved in opposite working directions. In order to abolish tooth play that may be present, a small counterforce can be applied to guide rods 51, 52 during the working stroke thereof. For this purpose, for example, pneumatic cylinders or compression springs can be utilized. Knife drive 50 can be controlled via a computer whereby the supply movement, the working stroke and the pullback movement of the knives can be preselected via programming. In place of two knife pairs 54, 55 with single edged V-knives (as illustrated in FIGS. 3 and 6) the first knife pair 54 can be comprised of single-edged V-knives and the second knife pair 55 can be comprised of single-edged stripping knives (FIG. 4), whereby the stripping quality can be increased.

In FIGS. 6a to 6e, the severing and stripping plane is symbolized via a dot-dash line L. Numeral 60 denotes the insulation remnants that were stripped from the cable ends. Cable 25, or rather the cable ends, are rotated 90° opposite to the illustration of the knife pairs.

Figure 7:
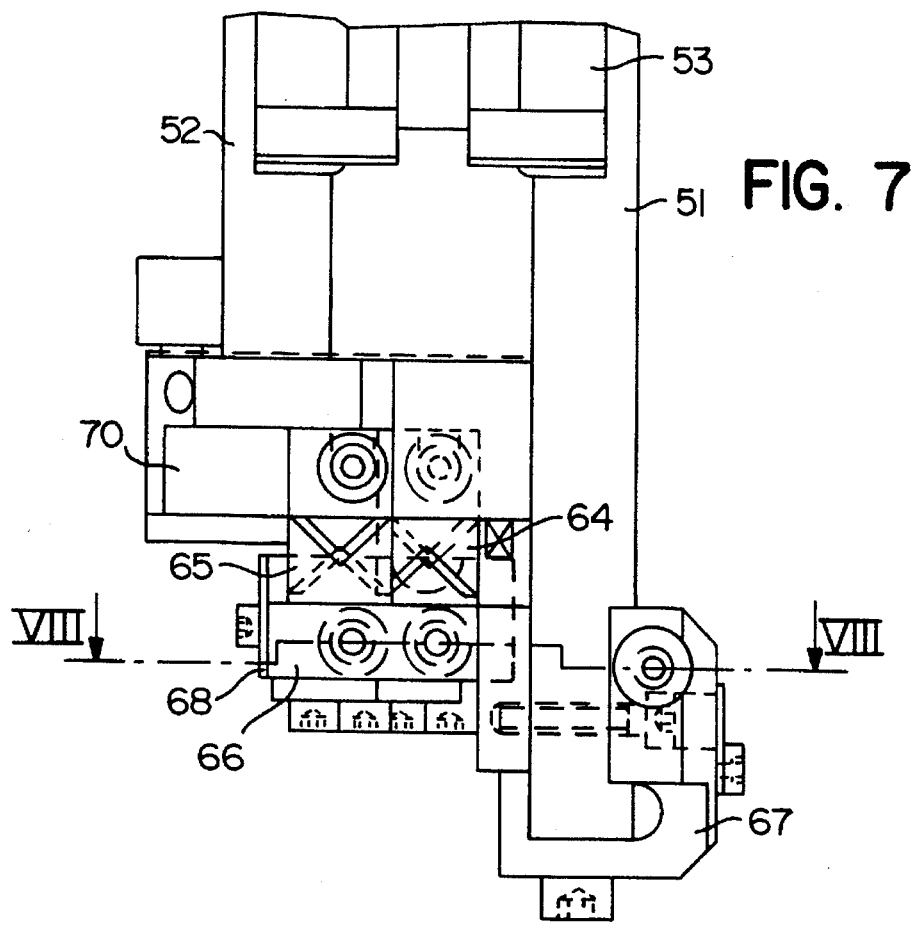
FIG. 7 is a partial view of a further variation of the knife drive.
Figure 8:
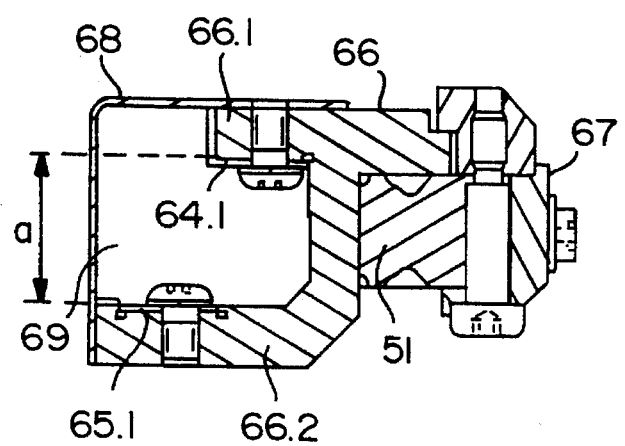
FIG. 8 is a section of the knife drive according to Line VIII—VIII of FIG. 7.

According to FIGS. 7 and 8, at the lower ends of each of guide rods 51, 52 of knife drive 50, two knives of two knife pairs 64, 65 are arranged in such a manner that they are, transverse to the longitudinal direction of the cable, laterally and in the longitudinal direction of the cable, at a distance (a) offset from each other. The lower knives 64.1, 65.1 of knife pairs 64, 65 are screwed onto a first knife retainer 66, which is attached to first guide rod 51 via a clamping device 67. First knife retainer 66 includes a short leg and a long leg 66.1, 66.2, respectively, which extend parallel, at a space (a), to one another. Screwed onto short leg 66.1 is the lower knife 64.1 of first knife pair 64 and the lower knife 65.1 is screwed onto the long leg 66.2 of second knife pair 65. Additionally, an angularly formed cover 68 is attached to legs 66.1, 66.2, whereby an enclosure 69, with a substantially prismatic cross section is formed. Via enclosure 69, the insulation remnants that accumulate during the stripping of the cables are concentrated in a relatively small space and can be removed therefrom without problems. The upper knives of knife pairs 64, 65 are screwed onto a second knife retainer 70, which, while being clamped onto second guide rod 52, is not illustrated further. As with the embodiment according to FIGS. 3 and 5, the bearing surfaces of the knives of second knife pair 65 are so inclined relative to the bearing surfaces of the knives of first knife pair 64 that, during the pivoting of pivot mechanism 3, from the first to the second knife pair, the cable can be gradually furnished vertically to the knife edges.

In FIGS. 9a to 9e the severing plane of the cable and the stripping plane of the one cable end is symbolized via a dot-dash line L'. Numeral 71 denotes the insulation remnants that were stripped from the cable ends. The cable ends and knife pairs 64, 65 that are shown in connection with line L', are rotated 90° opposite the illustration of the knife drives.

Figure 9E:
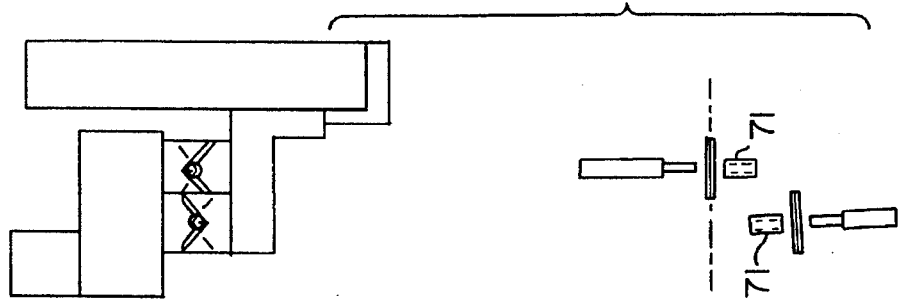
FIGS. 9a to 9e show the knife drive of FIG. 7 in different working positions and the corresponding fabrication conditions of the cable or rather the cable ends.
Figure 9D:
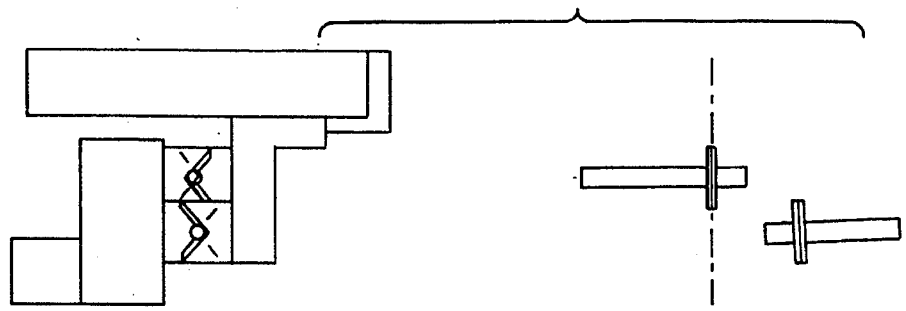
Figure 9C:
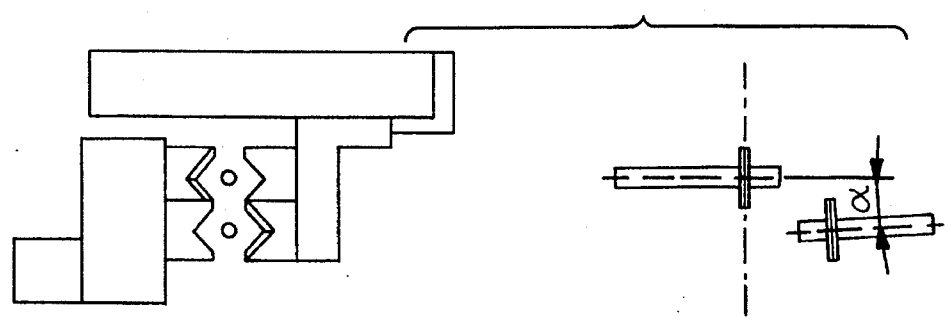
Figure 9B:
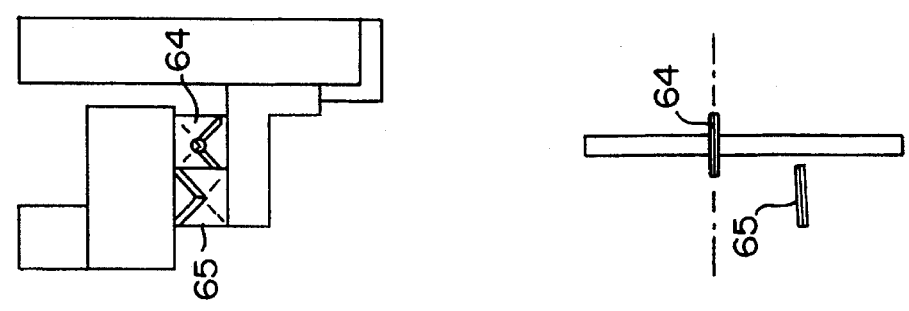
Figure 9A:
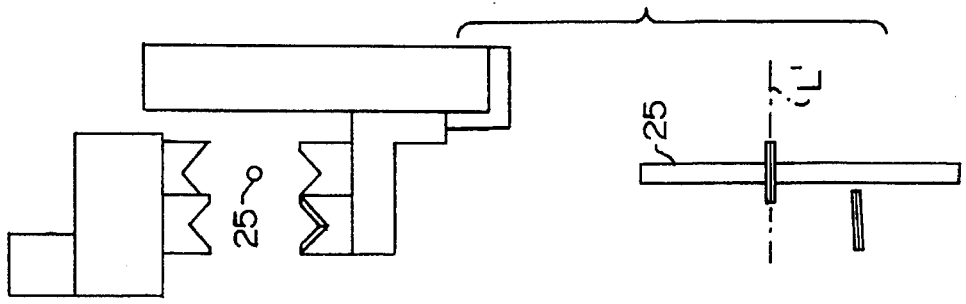

The previously-described mechanism functions as follows: Cable 25 is transported between the opened knives of the first knife pair 54, 64 (FIGS. 6a, 9a) in the direction of the arrow (FIG. 1) for a predetermined, selected length and is fixedly retained via clamping devices 24 and 46. Thereafter, the cable is severed by the first knife pair 54, 64 (FIGS. 6b, 9b) and is pulled back on both sides, via offtake drives 11 and 30, for about 1 to 2 mm. At the same time, with the renewed opening of the knives, which occurs in dependence upon the diameter of the cable, pivot mechanism 3 is pivoted to the second knife pair 55, 65, which, with reference to the chosen measurement, corresponds to an angle α of about 3° (FIGS. 6c, 9c). The cable end being held by the second clamping device 46 here, however, remains stationary. Thereafter, the cable ends, via offtake drives 11 and 30, are so far displaced in the direction against the knives, until the desired stripping length is achieved. Hereby, the displacement occurs in accordance with FIG. 6c in reverse and in accordance with FIG.. 9c in the same direction. For the purpose of stripping, this is followed by a knife stroke onto the required cross section (FIGS. 6d, 9d) and the offtake of the insulation remnants (60, 71) is accomplished via the return movement of offtake drives 11 and 30 (FIGS. 6e, 9e). By means of the variation of FIGS. 7 and 8, the insulation remnants 71 are concentrated in a smaller space.

Via the use of the knife pairs of FIG. 4, initially the cable end held by the first clamping device 24, is stripped with form-stripping knives and then the cable end, held by the second clamping device 46, is stripped with V-knives, whereby the knife stroke is different.

It is also possible that single edged V-form knives can be used for both knife pairs 54, 55 or 64, 65.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. A severing and stripping mechanism for an automatic cable-processing machine, for cutting and then stripping the insulation from the cut ends of a moving electrical cable, said mechanism comprising:

multiple knife pairs having knives;

said knives being attached, via knife retainers on actuating members of a knife drive;

multiple offtake drives for displacing said cable ends, after severing of said cable for the purpose of stripping said insulation from said cut ends;

said knife drive being arranged above a plane determined by the cable being processed;

first and second knife pairs, with the knives of said knife pairs being attached on said knife retainers transversely to the longitudinal moving direction of said cable and laterally offset from each other;

a fixed pivot mechanism provided on a machine frame, said pivot mechanism, after the severing of said cable with said first knife pair, pivoting one of said cable ends to said second knife pair;

said second knife pair being utilized for stripping said one of said cable ends; and said first knife pair being utilized for stripping another one of said cable ends.

2. The severing and stripping mechanism of claim 1, wherein, said knives are directly attached side-by-side, at said knife retainers.

3. The severing and stripping mechanism of claim 1, wherein said knives are attached at said knife retainers, in the longitudinal moving direction of said cable, offset at a spacing (a) from each other.

4. The severing and stripping mechanism of claim 1, wherein a first offtake drive is attached at said pivot mechanism and a second offtake drive is attached at said machine frame.

5. The severing and stripping mechanism of claim 4, wherein:

said pivot mechanism includes a cogged belt wheel, said cogged belt wheel being attached on a hollow shaft, with said hollow shaft being journalled in a bearing portion connected with said machine frame;

said first offtake drive is attached, on said cogged belt wheel, with a base plate; said mechanism further including:

said first offtake drive, having a drive shaft, with said drive shaft extending through said hollow shaft, and being journalled at an upper end thereof in said base plate;

a cogged belt wheel being provided at said upper end of said drive shaft, said cogged belt wheel being connected, via a cogged belt, with a further cogged belt wheel, said further cogged belt wheel being journalled at said base plate;

guide rods being attached to side plates, with said side plates being connected with said base plate;

a slide rest being carried by said guide rods, said slide rest being connected with said cogged belt via a coupling part; and a first clamping device, for the clamping of said cable, being attached on said slide rest.

6. The severing and stripping mechanism of claim 5, wherein:

said second offtake drive includes a base plate and a cover plate, said base and cover plates being connected with each other via bearing brackets;

a drive shaft, said drive shaft having a lower end thereof journalled in said cover plate and carrying another cogged belt wheel, said another cogged belt wheel being connected, via a further cogged belt, with a further cogged belt wheel, said further cogged belt wheel being journalled on said cover plate:

further guide rods are displacably journalled in bearing brackets, said bearing brackets being connected with a coupling part attached at said further cogged belt, wherein at one of the ends of said further guide rods a connecting plate is attached and at another of the ends of said further guide rods a mounting plate is attached; and a second clamping device, is arranged on said mounting plate for the clamping of a severed cable end.

7. The severing and stripping mechanism of claim 1, wherein:

said actuation members are prismatic guide rods, that extend, in a guide housing, in the vertical direction;

said guide rods being formed as gear racks at the upper ends thereof and being in mesh with a pinion of a motor;

said knife pairs including lower knives, with said lower knives, via a first knife retainer, being attached at a lower end of said first guide rod; and said knife pairs including upper knives, with said upper knives, via a second knife retainer, being attached at a lower end of said second guide rod.

8. The severing and stripping mechanism of claim 7, wherein:

said knives are attached at said knife retainers, in the longitudinal moving direction of said cable, offset at a spacing (a) from each other; and said the first knife retainer having a short leg and a long leg, said legs extending parallel, at a distance (a) to one another;

said lower knife of said first knife pair being attached to said short leg and said lower knife of said second knife pair being attached to said long leg; and an angularly formed cover is attached to said short and long legs, thereby forming an enclosure with a substantially prismatic cross section.

9. The severing and stripping mechanism of claim 7, wherein both of said knife pairs are comprised of one of single edged V-knives and V-formed knives.

10. The severing and stripping mechanism of claim 7, wherein said first knife pair is comprised of single-edged knives and said second knife pair is comprised of single-edged stripping-form knives.

* * * * *